Patented May 14, 1935

2,001,276

UNITED STATES PATENT OFFICE 2,001,276

LAMINATED CELLULOSE UNIT AND PROCESSES OF MAKING SAME

Irving Fink Laucks, Seattle, Wash., assignor to I. F. Laucks, Inc., Seattle, Wash., a corporation of Washington No Drawing. Application November 21, 1932, Serial No. 643,739

8 Claims. (Cl. 20—91)

It has heretofore been discovered that cellulose xanthogenates may be used as adhesives.

I have now discovered however that xanthogenates made from oxycellulose are particularly useful as adhesives when applied to wood and particularly to veneers or plywood, and possess advantages over xanthogenates manufactured from cellulosic material without the intermediate step of the making of oxycellulose. This is distinctly different from the use of viscose in making of threads as in the latter case oxycelluloses are avoided.

To the accomplishment of the foregoing and related ends, the invention, then comprises the features hereinafter fully described, and particularly pointed out in the claims, the following description setting forth in detail certain illustrative embodiments of the invention, these being indicative however, of but few of the various ways, in which the principle of the invention may be employed.

For the purposes of this disclosure the term "oxycellulose" may be defined to include those products resulting from the action of oxidizing agents on cellulosic materials. The cellulosic materials which may be treated with oxidizing agents to form compounds which, for the purposes of this disclosure, I term "oxycelluloses" or oxycellulose-containing materials, include cellulosic materials of widely different origin; for example highly purified sulphite pulp containing 85% or more alpha cellulose; sawdust of various woods as fir, pine, birch, alder, etc.; seed hulls as oat hulls, rice hulls, soyabean hulls, etc.; straw and plant fibres, etc.; cotton, etc. Also the term "oxycellulose-viscose" may be defined to include all compounds resulting from the treatment of oxycelluloses, as above defined, with caustic soda and carbon bisulphide, whether these resulting compounds are true cellulosic xanthogenates or not and whether pure or mixed with other compounds resulting from the treatment of cellulosic and/or hemi-cellulosic materials with oxidizing agents and subsequently with caustic soda and carbon bisulphide.

I have found further that certain cellulosic materials, as for example oat hulls and straw, may be treated with lesser amounts of strong oxidizing agents or with less active oxidizing agents than are required with sulphite pulp, or cotton for example, in order to secure satisfactory oxycellulosic intermediate material for the manufacture of oxycellulosic viscoses suitable for use as adhesives.

"Viscoses" suitable for use as adhesives may be made from "oxycellulosic-materials" more quickly and conveniently than is the case when unoxidized cellulosic materials are used as base materials.

Cellulosic material may be oxidized to "oxycellulosic" material by several well known methods, for example by treatment with nitric acid, by treatment with potassium permanganate, by treatment with potassium dichromate, by treatment with calcium hypochlorite or with chlorine, by treatment with potassium chlorate, by treatment with air, oxygen, ozone, hydrogen peroxide and other peroxides both with and without catalytic agents such as ferrous sulphate, nickel sulphate, etc. All of these methods have been used by me to produce "oxycellulosic" materials suitable for use in manufacturing oxycellulosic-viscose adhesives. I do not wish to restrict myself to oxidized celluloses made by the above identified methods alone but I claim the "oxycellulose-viscose" adhesives resulting from the treatment of oxidized cellulosic materials having properties equivalent to the properties of the products resulting from the treatment of cellulosic materials, as herein defined, with oxidizing agents as above enumerated.

The use of "oxycellulose-viscose" as an adhesive and particularly as an adhesive for plywood has been exemplified by me in the following manner:—

Cellulosic material is oxidized by a method suitable for the particular material. The "oxycellulose" resulting is then treated successively with caustic soda and carbon bisulphide. The product falls within the class of substances termed, for the purposes of this application, "oxycellulose-viscose" and the same is applicable as an adhesive and particularly as an adhesive for plywood.

For further exemplification I may give the following details of experiments illustrating my discovery:—

200 grams of cotton linters were placed in a closed container together with 700 grams of a 47½% solution of nitric acid. The whole was heated one hour, then removed from the container, washed and dried. This product falls within my definition of "oxycellulose."

15 grams of this "oxycellulose" was immersed with 300 cc. of 18% caustic soda solution for 62 hours, then pressed down to a weight of 53 grams of alkali pulp which was permitted to age for five days. At the end of this period the pulp was ground with 9 cc. of carbon bisulphide and allowed to stand 2 hours. The "oxycellulose-viscose" was then spread on fir plywood, panel assembled and pressed in the usual manner of making plywood. Fir panels so made have been submerged in water for more than two months without any sign of separation of the plies. This is a most severe test and an exemplification of the great merit of my discovery of the use of "oxycellulose-viscose" as an adhesive for wood.

Another example:—

30 grams of sulphite pulp were boiled one hour in 3 liters of water containing 150 grams of potassium chlorate in solution, then 125 cc. of 35% hydrochloric acid were slowly added. The resulting mass was washed, ground through a screen and dried. 10 grams of this oxycellulose product were stirred with 50 cc. of 18% caustic soda solution, allowed to stand 1½ hours, 8 cc. carbon bisulphide stirred in and the mass allowed to stand one hour, and then spread on plywood. This plywood stands soaking for remarkably long periods without separation of the plies. It will be noted that the oxycellulose viscose suitable for use as a plywood glue is prepared from the basic cellulosic material in a period of less than four hours and therefore makes possible the complete manufacture of the glue from the basic cellulosic material at the plywood plant or point of use, which is a very marked and extended forward step in the industry and will be particularly noted as such by those skilled in the plywood art.

Another example:—

200 grams of ground oathulls were heated on a waterbath for one hour with 300 grams of 47½% nitric acid. The mass was then washed, ground and dried. 10 grams of this oxycellulosic material were stirred with 30 cc. of 18% caustic soda solution for 2¾ hours, then 6 cc. of carbon bisulphide were stirred in and the mass allowed to stand for 1½ hours after which 20 cc. of water were added and stirred in. This oxycellulosic-viscose was then spread on plywood and the plywood assembled into panels in the usual manner. These panels also showed excellent dry adhesion and great resistance to separation of the plies by prolonged soaking in water. In this case the whole operation was accomplished in less than six hours.

Another example:—

20 grams of sulphite pulp were saturated with a dilute solution of nickel sulphate and oxygen passed into and through the mass at a slow rate for a period of five hours after which the mass was pressed, dried and ground. 10 grams of this oxycellulosic material were immersed four hours in 250 cc. of 18% caustic soda solution, then pressed to 50 grams weight and allowed to stand 18 hours. The material was then heated for two hours at 75° C., then 8 cc. of carbon bisulphide was added and the whole allowed to stand for 1½ hours, then 20 cc. water added and the mass allowed to stand for four hours at the end of which period the resulting "oxycellulose-viscose" glue was spread on fir veneer which was assembled and pressed in accordance with common practice. The resulting panels have high strength and superior water resistance. In the foregoing example air has been used instead of oxygen with a longer period of treatment.

The time required for the manufacture of a complete adhesive from the basic raw material as above described may be shortened by omitting the drying step between the preparation of the "oxycellulosic material" and the further treatment to make oxycellulose-viscose.

The product resulting from the use of "oxycellulose-viscose" adhesive or glue as the binding medium in the manufacture of units from individual parts is new and particularly applicable in the manufacture of plywood which is water resistant to a marked degree. Quantities of adhesive necessary for immediate use or use from day to day in the plywood plant may be made right at or close to point of use. There is no necessity of carrying high priced finished glues or partially manufactured glues in stock. The stock carried would be only the raw cellulosic material and the necessary chemicals purchased as such and not as complicated blended mixtures. The consequent reduction in working capital necessary is evident. The oxycellulose-viscoses have further advantages in ease of handling, direct line use and simplicity of manufacture. The "oxycellulosic material" may be prepared and shipped to the glue user who by adding the caustic soda and carbon bisulphide prepares the oxycellulosic viscose right at the point of use.

When the oxycellulose-viscose is used as a binder for wood sheets there is provided a complete unit of a cellulosic nature and as such a unit composed of closely allied chemical substances. It is evident that such a unit would be less liable to rupture at the joint planes resulting from internal stresses and strains set up by moisture changes than would another unit in which the binding material was a chemical composition radically different from that of the other component parts.

Other modes of applying the principle of the invention may be employed instead of those herein explained, change being made as regards the details disclosed, provided the features stated in any of the following claims, or the equivalent of such, be employed.

I therefore particularly point out and distinctly claim as my invention:

1. A cellulose unit composed of laminations of cellulosic material bound together with a substantially uninterrupted film of an adhesive oxycellulose viscose.

2. A unit composed of wood laminations bound together with a substantially uninterrupted film of an adhesive oxy-cellulose viscose.

3. A cellulose unit composed of laminations of cellulosic material bound together with a substantially uninterrupted film of an adhesive of sulphite pulp oxycellulose viscose.

4. A cellulose unit composed of laminations of cellulosic material bound together with a substantially uninterrupted film of an adhesive of oat hulls oxycellulose viscose.

5. A process of manufacturing units of cellulosic material, which comprises assembling layers of cellulosic material with an interposed substantially uninterrupted film of oxy-cellulose viscose binder, and applying pressure to the assembled layers.

6. A process of manufacturing plywood, which comprises assembling wood plies with an interposed substantially uninterrupted film of oxycellulose viscose binder, and applying pressure to the assembled ply structure.

7. A process of manufacturing units of cellulosic material, which comprises assembling layers of cellulosic material with an interposed substantially uninterrupted film of binder of sulphite pulp oxycellulose viscose, and applying pressure to the assembled layers.

8. A process of manufacturing units of cellulosic material, which comprises assembling layers of cellulosic material with an interposed substantially uninterrupted film of binder of oat hulls oxycellulose viscose, and applying pressure to the assembled layers.

IRVING FINK LAUCKS.